United States Patent [19]

Leach

[11] 4,100,242

[45] * Jul. 11, 1978

[54] METHOD OF MOLDING AQUEOUS SETTABLE SLURRIES CONTAINING SHREDDED OPEN-CELL POLYSTYRENE PARTICLES

[76] Inventor: Irby H. Leach, 2094 Emerson, Napa, Calif. 94558

[*] Notice: The portion of the term of this patent subsequent to Jun. 5, 1990, has been disclaimed.

[21] Appl. No.: 279,422

[22] Filed: Aug. 10, 1972

Related U.S. Application Data

[60] Continuation-in-part of Ser. No. 118,569, Feb. 24, 1971, abandoned, which is a division of Ser. No. 844,895, Jul. 25, 1969, Pat. No. 3,630,820, and Ser. No. 118,483, Feb. 24, 1971, Pat. No. 3,686,068, which is a division of Ser. No. 844,896, Jul. 25, 1969, Pat. No. 3,627,211.

[51] Int. Cl.² .................... B28B 21/02; B28C 5/00
[52] U.S. Cl. ........................ 264/115; 106/90; 106/111; 156/39; 521/56; 264/140; 264/333; 264/DIG. 7; 428/402
[58] Field of Search ............... 264/DIG. 7, 2.5 B, 45, 264/53, 140, 333; 106/90, 171; 156/39; 428/402

[56] References Cited

U.S. PATENT DOCUMENTS

| 1,859,853 | 5/1932 | Thomson | 156/39 |
|---|---|---|---|
| 1,915,603 | 6/1933 | Gough | 156/39 |
| 1,932,956 | 10/1933 | Crandell | 156/39 |
| 2,940,505 | 6/1960 | Brothers | 156/39 |
| 2,985,219 | 5/1961 | Summerfield | 156/39 |
| 3,114,722 | 12/1963 | Einhorn et al. | 264/DIG. 7 |
| 3,251,916 | 5/1966 | Newnham et al. | 264/DIG. 7 |
| 3,257,338 | 6/1966 | Sefton | 264/DIG. 7 |
| 3,338,848 | 8/1967 | Hamilton | 260/2.5 B |
| 3,630,820 | 12/1971 | Leach | 156/39 X |
| 3,697,366 | 10/1972 | Harlock et al. | 260/2.5 B X |
| 3,764,357 | 10/1973 | Bowles et al. | 106/90 |
| 3,869,295 | 3/1975 | Bowles et al. | 106/90 |
| 4,019,919 | 4/1977 | DeSalvo | 106/90 |

FOREIGN PATENT DOCUMENTS

| 1,496,935 | 8/1967 | France | 264/DIG. 7 |
|---|---|---|---|
| 889,278 | 2/1962 | United Kingdom | 264/DIG. 7 |

OTHER PUBLICATIONS

Lea, F. M., "The Chemistry of Cement and Concrete," Revised Edt. of Lea and Desch, London, Edward Arnold (publishers), Ltd., c 1956, pp. 305–309.
Eirich, Frederick, R., Edt., "Rheology Theory and Applications," vol. 3, New York, Academic Press, 1960, pp. 341–354.

*Primary Examiner*—Philip Anderson
*Attorney, Agent, or Firm*—Townsend and Townsend

[57] ABSTRACT

Closed cell foamed polystyrene beads are shredded to form small size, open-celled foam particles. The particles are mixed with a slurry of a granulate and a liquid whereby the slurry enters the open cells to increase the density of the particles. After an even distribution of the particles throughout the slurry is obtained the mixture is dried to form granulate objects, such as boards, having an even distribution of foamed polystyrene particles therein to reduce the density of the object.

6 Claims, 6 Drawing Figures

METHOD OF MOLDING AQUEOUS SETTABLE SLURRIES CONTAINING SHREDDED OPEN-CELL POLYSTYRENE PARTICLES

RELATED APPLICATIONS

This application is a continuation-in-part of the commonly owned, copending patent applications Ser. No. 118,569 filed Feb. 24, 1971, and now abandoned for GRANULAR FORMATIONS INCLUDING OPEN CELL POLYSTYRENE PARTICLES which was a division of Ser. No. 844,895 filed July 25, 1969 for GRANULAR FORMATIONS INCLUDING OPEN CELL POLYSTYRENE PARTICLES, now U.S. Pat. No. 3,630,820 and Ser. No. 118,483 filed Feb. 24, 1971 now U.S. Pat. No. 3,686,068 for METHOD AND APPARATUS FOR SHREDDING FOAM which was a division of Ser. No. 844,896 filed July 25, 1969, for METHOD AND APPARATUS FOR SHREDDING FOAM, now U.S. Pat. No. 3,627,211.

BACKGROUND OF THE INVENTION

It is now relatively common to incorporate lightweight particles into relatively high density slurried granulate materials which are then formed and dehydrated into objects such as boards, moldings and the like. To the many desirable characteristics of the granulate, such as good thermal and acoustic insulating characteristics, fire-resistance and low cost, the further advantage of a reduced weight is added to facilitate the handling of the granulate and reduce transportation costs.

In the past it has been common to incorporate polystyrene foam particles into a slurry of a granulate, such as gypsum, concrete or mortar for example, and a liquid, usually water. The slurry is then agitated to evenly distribute the foam particles throughout the slurry. However, as soon as agitation ceases the buoyancy of the low-density foamed particles floats the particles to the slurry top. This prevents the formation of an even slurry-foamed particle mixture, particularly since it usually takes several hours or days to dehydrate the slurry and dry the granulate into solid objects. During that period the foamed particles invariably float to the top of the slurry or at least tend to concentrate in the upper region thereof.

Foamed polystyrene beads have become widely accepted for mixing with granulates because of their fire-resistancy, an essential for building materials, and their low cost. Such beads usually have sizes ranging from between about 3 to about 10 millimeters in diameter. The bead size is too great for direct incorporation in the granulates since such large beads would noticeably weaken the hardened granulate. Consequently, the beads were reduced in size by cutting them with sharp blades or knives. The cuts were clean and essentially planar and damaged a minimum number of the foamed bead cells. Heretofore this was assumed to be desirable, giving the cut beads a generally neat and clean appearance. As will become more apparent hereinafter this contributed heavily to the problems encountered in attempts to evenly distribute such foamed particles in the slurry to decrease the density of the finally dehydrated granulate.

SUMMARY OF THE INVENTION

The present invention provides a method which allows the equal distribution of low-density foamed particles throughout a slurry. Briefly, the method comprises the steps of mixing granular materials to form a slurry and shredding closed-cell, foamed polystyrene beads into particles so that a substantial portion of the cells of each particle are open. The particles are introduced into the slurry and mixed to evenly distribute them throughout the slurry. The slurry penetrates open cells of the particles and causes an increase in the particle density to prevent flotation of the particles and maintain the even particle distribution.

The particles are preferably shredded from foamed polystyrene beads by placing the beads between relatively moving tearing surfaces having sawtooth-like serrations. The tearing surfaces are defined by substantially circular, opposing surfaces rotating in opposing directions and at differing speeds. The shredded or torn particles are screened to remove excessively large particles leaving the small size shredded foam particles.

The shredded particles have non-planar, randomly distributed and disposed and uneven exterior surfaces and ragged serrated ridges so that a substantial number of the theretofore closed foam cells are opened. The tears and serrations extend from the surfaces towards the interior of the particles. This maximizes the areas of the various surfaces, the tears and serrations intersecting and opening a substantial number of theretofore closed foam cells. When mixed with the slurry the increased density of the foamed particles causes a corresponding decrease in the buoyancy forces biasing them upwardly. If a sufficient number of cells is penetrated with the slurry the buoyancy of the particles ceases, or becomes so small that the usually high viscosity of the slurry prevents the particles from rising.

The heretofore experienced flotation of the particles and their uneven distribution throughout the slurry and the subsequently dehydrated granulate object are eliminated. As more fully set forth in the above referred co-pending patent application, the physical size of the particles can be varied according to need. The proportion of foamed particles in the slurry, and the finished dehydrated granulate object, is of course dependent upon the desired reduction in the density of the object. That density reduction is a function of the total proportional volume occupied by the particles and a result of the removal of slurry from the open cells during and after the dehydration of the slurry.

DESCRIPTION OF THE PREFERRED EMBODIMENTS

Figure 1:
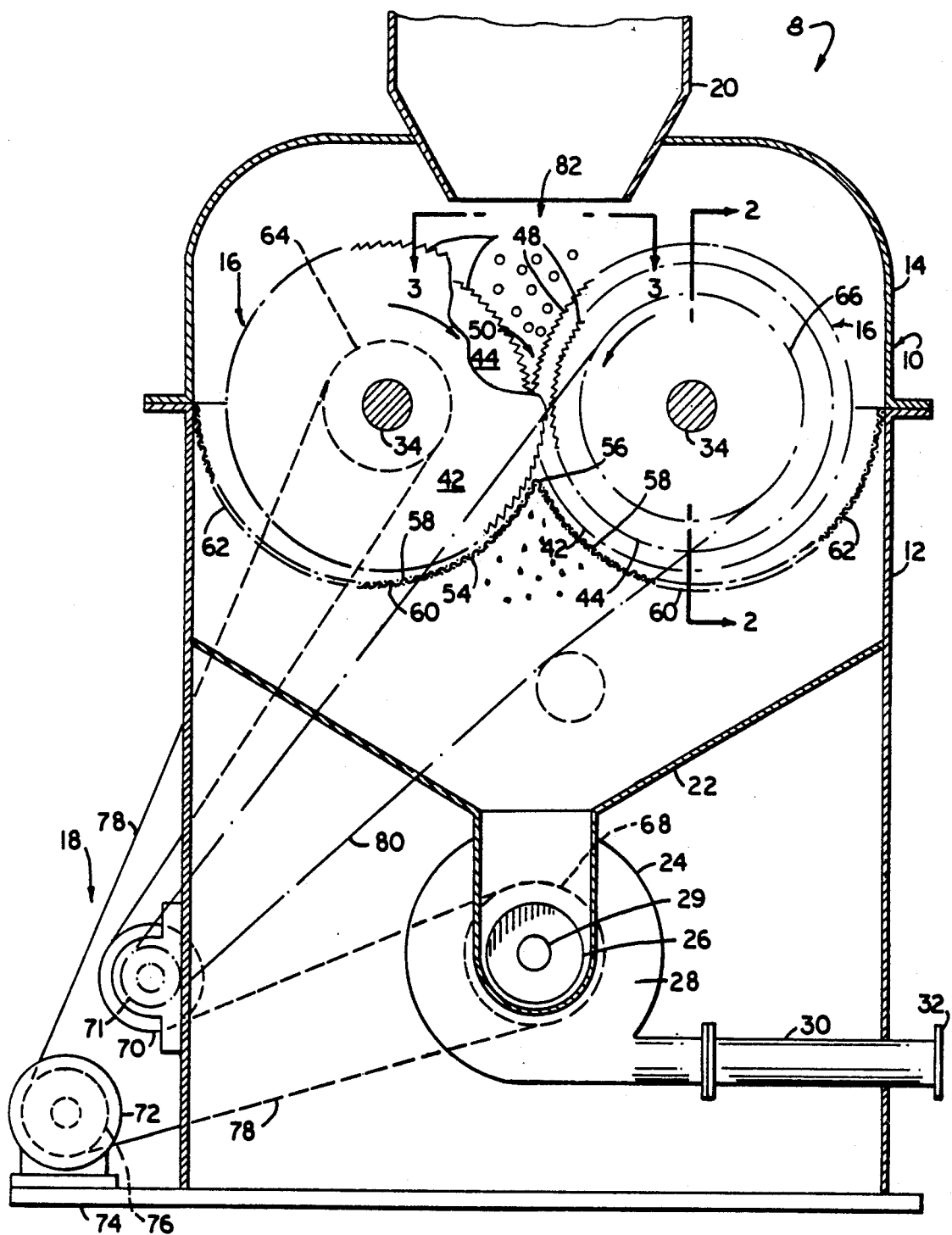
FIG. 1 is a schematic front elevational view, with parts broken away, of a shredding apparatus for the formation of shredded, open cell foam particles.
Figure 2:
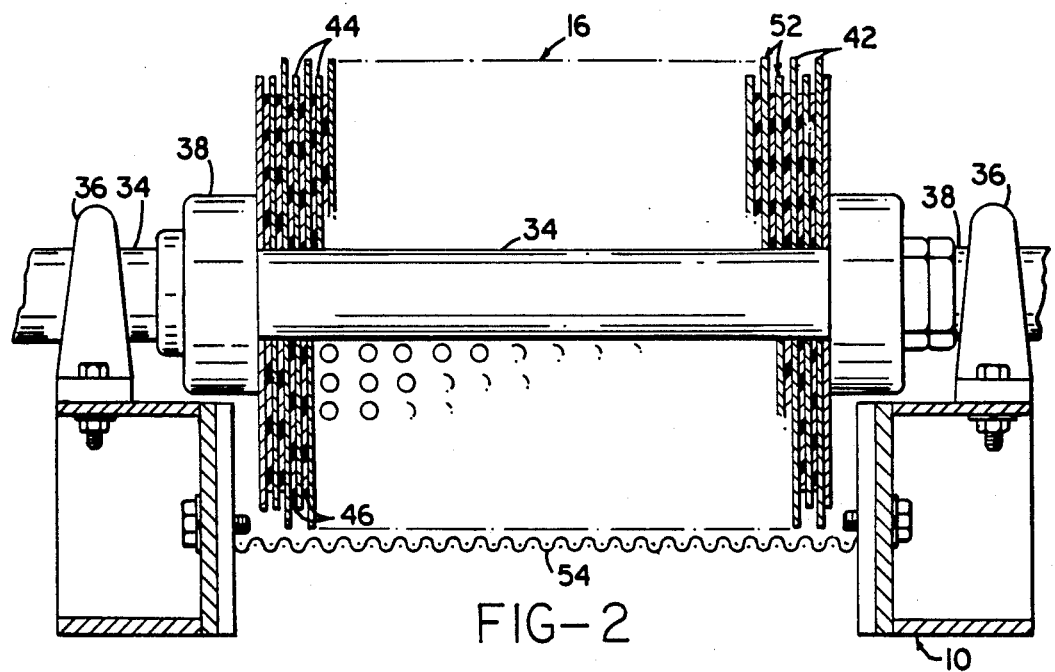
FIG. 2 is an enlarged elevational view, in section, and is taken on line 2—2 of FIG. 1.
Figure 3:
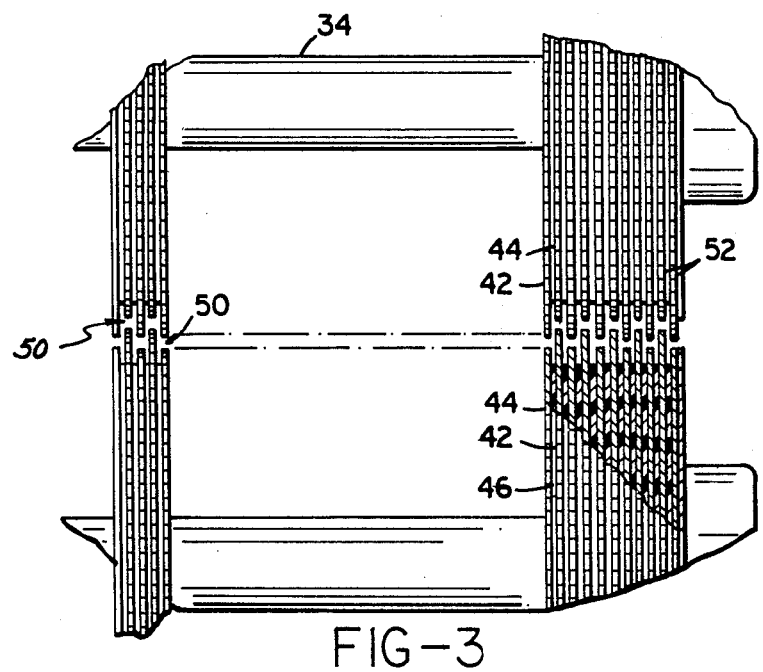
FIG. 3 is a fragmentary, enlarged plan view, in section, of the intermeshing tearing surfaces of the apparatus illustrated in FIG. 1 and is taken on line 3—3 of FIG. 1.

Referring to FIGS. 1 through 3, a shredding machine 8 comprises an upright housing 10 defined by a base section 12 and a cover 14 demountably secured to the top of the base section. A pair of intermeshing shredder rolls 16 are rotatably mounted and disposed interiorly of the housing and actuated by drive means 18. A chute 20 is secured to cover 14 and positioned substantially vertically above the median between the two shredder rolls. The base section includes a collector funnel 22 beneath the rolls that terminates in a passageway 24 leading into a suction side 26 of an air blower 28. The impeller of the blower is also driven by drive means 18. The pressure side of the blower is connected to a conduit 30 terminating at the exterior of housing 10 in a connecting flange 32.

In operation particles to be shredded enter through chute 20, are shredded or torn by the co-action of the shredder rolls 16, are collected by funnel 22 and fed to the suction side 26 of blower 28 for transport to a point of use as more fully described hereinafter.

The shredder rolls are preferably of identical construction and each comprises a shaft 34 rotatably mounted in journal bearing 36 secured to the exterior of housing 10 in a conventional manner. One side of the shaft includes an annular ring 38 while another side of the shaft includes a threaded portion 40. Both the ring and the threaded portion are inward of the shaft extremities which extend through the journal bearings. A multiplicity of large and small diameter, circular disc-shaped tear plates 42 and 44, respectively, are alternatingly spaced over the length of shaft 34 between ring 38 and threaded portion 40. The tear plates are spaced apart by spacers 46 a distance about equal to or slightly greatly than the thickness of the tear plates. The periphery of the tear plates includes regularly spaced, transverse and generally tooth-shaped serrations 48 which have a depth of between about 1/64th to about 3/16ths of an inch, the preferred depth range being between about 1/16th to about ⅛th of an inch for the shredding of foamed polystyrene beads as more fully described hereinafter.

Referring particularly to FIGS. 1 and 3, the actual spacing between shafts 34 of the shredder rolls is slightly greater than the combined radii of the small and the large diameter tear plates 42 and 44 but is less than the combined distance of the radii of two large tear plates 42 so that the tear plates of the two shredder rolls overlap (as best shown in FIGS. 1 and 3) and the tear plates interlace. There remains a narrow gap 50 between the tear surfaces 52 of opposing tear plates of the two shredder rolls. The magnitude of the gap is a function of the desired size of the shredded particles. For the shredding of foamed polystyrene beads having a density of between about 0.2 and about 0.5 pounds per cubic foot, an expanded bead size of between about ⅛th to about ⅜ths inch diameter, and a desired shredded maximum particle size of about 3/16ths of an inch, gap 50 has a width of about 1/32 inches.

Referring again to FIGS. 1 through 3, a screen 54 is placed beneath shredder rolls 16 and is secured to side walls of housing base section 12 in a conventional manner as with threaded bolts. Generally, the screen has a double crescent shape (as shown in FIG. 1) and is defined by a center ridge 56, a first screen section 58 between the center ridge and a point 60 about vertically below the axis of shaft 34, and a second screen section 62 extending from point 60 to housing base section 12.

The first screen section has a circular configuration with the center of the circle being the axis of the corresponding shredder shaft 34 so that the screen section is parallel to the tear surfaces of the tear plates 42, 44. The radius of the first screen section is such that the spacing between the section and the tear surfaces is in the range of about 1/16th inch plus the maximum desired average dimension of the shredded particles or less. In the above example in which polystyrene foam particles are shredded to a maximum dimension of about 3/16th inch the spacing between the tear plate surfaces 52 and the first screen section 58, in a radial direction, is about 1/16th inch.

The second screen section is eccentric with the tear plates and the spacing, in a radial direction, between the tear surfaces and the second screen section increases gradually and continuously from adjacent point 60 to the end of the second screen section. The maximum spacing between the tear surfaces and the end of the second section is not critical.

The screen as such may be constructed of a variety of materials and has mesh or screen openings which permit the passage of the desired particle sizes and prevent particles having excess dimensions from passing the screen. It is presently preferred to construct the screen of stamped-out sheet metal which lends itself readily to forming to give it the desired shape. If convenient, other materials, such as wire mesh, can be employed.

The dimensioning and shaping of the screen 54 is important to prevent shredded particles from clogging the space between the tear surfaces and the screen which can render the shredder inoperable. Contrary to the expected effect, an increase in the spacing between the tear surfaces and the screen beyond the above stated range leads to an increased tendency of clogging. The exact dimensionality of the spacing between the tear surfaces and the first screen section 58 is further a function of the material being shredded and may require periodic adjustments of the spacing.

To enable the ready transport of oversized shredded particles away from beneath the shredder rolls the second screen sections 62 open up. Oversize shredded particles incapable of passing through the screen are thereby recirculated by the shredder rolls (as described below) into the upper space of housing cover 14 for reshredding. Waste of oversize particles is prevented and the recirculation and reshredding is accomplished without additional feeding mechanisms and the like.

Referring to FIGS. 1 and 3, drive means 18 is schematically illustrated and comprises a relatively small diameter pulley 64 mounted to one of the extremities of the left hand shredder shaft 34 (as seen in FIG. 1), a relatively large diameter pulley 66 mounted to the extremity of the right hand shredder shaft and a pulley 68 mounted to the extremity of air blower shaft 29 on the side of housing 10 so that it is aligned with pulley 64. A pair of axially spaced idler pulleys 70, 71 are interconnected and mounted on the exterior of housing 10. Each idler pulley is aligned with one of the shredder pulleys 64, 66.

A conventional electric motor 72 is mounted to a support plate 74 and includes a pulley 76 over which a belt 78 is looped. Belt 78 is further looped over one of the idler pulleys 70, blower pulleys 68 and the left hand, small diameter shredder roll pulley 64. A second belt 80 is looped over the second idler pulley 71 and the right hand, large diameter shredder roll pulley 66. The electric motor is hooked up so that its pulley rotates in a clockwise direction whereby the left hand shredder roll also rotates in a clockwise direction and the right hand shredder roll (as seen in FIG. 1) rotates in a counter-clockwise direction. Materials being shredded and entering the shredding machine 8 through chute 20 are thereby drawn into gap 50 between tear surfaces 52.

Aside from rotating in opposing directions it is preferred that the tear surfaces 52 move at different relative speeds. Consequently pulleys 64, 66, 70 and 71 are arranged so that one of the shredder rolls, say the left hand roll, rotates at a higher rpm than the left hand roll. In a presently preferred embodiment of the invention the pulleys are arranged so that the relative speed differential between the tear surfaces, and therefore the rpm differential between rolls, is between about 1:1,5 to about 1:6, with the preferred speed differential being about 1:4.

Turning now to the operation of the shredding apparatus, with particular reference to the shredding of the above mentioned foamed polystyrene beads, the beads enter through chute 20 and fall gravitationally into space 82 between and above the two shredder rolls 16. Serrations 48 of the tear plates 42, 44 grasp the beads and pull them downwardly. Due to the speed differential of the tear surfaces 52 the beads are shredded into small particles 84 (shown in FIGS. 4 and 6) in gap 50 between the tear surfaces. The movement of the tear surfaces transports the particles downwardly until they contact screen 54. Those particles which are smaller than the screen openings fall through the openings and hence unto collector funnel 22. The suction at suction side 26 of air blower 28 enhances the passage of those particles through the screen and their movement towards the blower. Shredded particles which are larger, i.e., which have a dimension greater than the maximum dimension of the screen openings, are prevented from passing the screen. They remain on the upper surface of the screen and are transported in the direction of rotation of the shredder rolls 16 towards the second screen sections 62. This removal of the excessively large particles is aided by direct contact between serrations 48 and such particles and by air movements or currents in the vicinity of the tear plate peripheries caused by the relatively high speed of the rolls. Thus, the oversize particles are in effect blown into the upper portion of housing cover 14 and into space 82 from where they are recycled through the shredder rolls for reshredding and size reduction.

The shredded particles have an irregular configuration, that is their outer surfaces are on the whole nonplanar, randomly distributed and uneven. The particles include ragged ridges or edges and tears extending from outer surfaces towards the interior or center of the particles. Thus, the surface area of the particles (which includes surfaces caused by the above referred to tears and serrations) is relatively large, as compared to the particle volume, and the surfaces intersect a substantial number of cells to thereby open the cells to the exterior.

Figure 4:
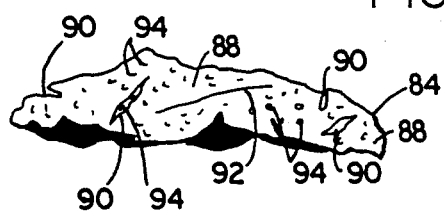
FIG. 4 is a plan view of a foamed particle shredded in accordance with the present invention.

Referring briefly to FIG. 4, a shredded particle 84 is illustrated. It has a generally elongate configuration although the particle can also have a more compact shape since all particle dimensions, shapes, etc., are purely random. The particle includes a randomly shaped, non-planar and uneven exterior surface 88, randomly disposed, sized and formed tears 90 extending from the exterior surface towards the center of the particle and ragged or serrated ridges or edges 92. The total exterior surface area of the particle is therefore defined by the exterior surfaces, the surfaces defined by the tears and those defined by the ridges. These surfaces intersect large numbers of formerly closed foam cells 94 which therefore become open cells.

Figure 5:
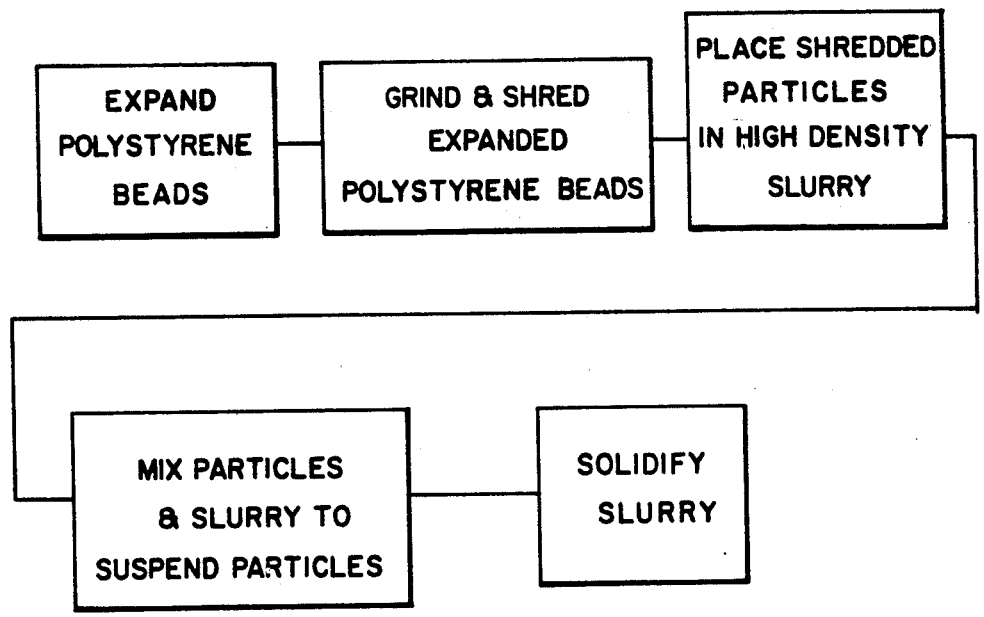
FIG. 5 is a schematic flow diagram of the method of the present invention.
Figure 6:
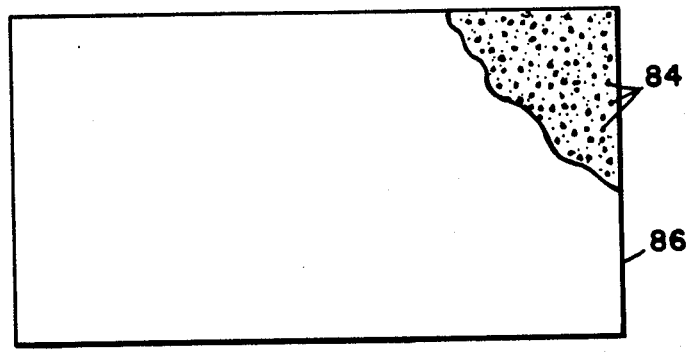
FIG. 6 is a view of a board constructed of a granulate material and showing parts of the board in section to illustrate the distribution of low-density foam particles throughout the board.

Referring to FIGS. 5 and 6, a particularly advantageous use of the particles is in the manufacture of granular objects, such as a board 86 formed by removing the liquid component from a slurry formed between granulates and the water. Generally such liquid removal involves the dehydration of water from the slurry and/or chemical reactions between the granulates and the water.

The granulates may comprise cement particles, sand, gypsum particles and the like, most commonly referred to as building materials. Such granulates have a high density and, therefore, high weight which often complicates their handling and increases their transportation costs. In accordance with the present invention the rate or density of such objects is reduced by including therein large numbers of the earlier described low density, open cell foam particles or beads 84.

The foam particles as such distract from the strength of the board so that they must be evenly distributed throughout the board volume. Concentrations of the foamed particles in certain portions of the board volume are therefore highly undesirable. Such concentrations are avoided since the shredded particles 84 have large numbers of open cells. The shredded foam particles are mixed with the slurry by agitating the slurry to obtain an even distribution of the particles. The slurry, and particularly the liquid phase thereof (i.e., the water) enters open cells of the foamed particles and thereby increases the density of the particles substantially so that they lose all, or at least the major portion of their buoyancy, and are prevented from rising towards the top of the slurry. Consequently, the foamed particles penetrated by the slurry remain evenly distributed throughout the slurry during the preparation of the slurry as well as during the slurry dehydration.

During the dehydration of the slurry water is being removed from between the granulates and from within the open cells of the foam particles 84 that have been penetrated by the slurry. Since the volume of each foam particle remains constant their density is thereby decreased which causes a proportional decrease in the density of the finish foamed and dehydrated object.

As already briefly mentioned a major use of the objects is in the building industry, such as in the form of gypsum boards. In such applications it is virtually essential that all materials are at least fire-resistant. Although various foam materials can be used it is presently preferred to use polystyrene, and particularly acrylonitrile styrene co-polymers for the foamed beads since that is a fire-resistant material and enhances the safety of the low density gypsum boards. Such foam material has the further advantage that the foamed beads can now be obtained at relatively low costs in densities as low as 0.2 pounds per cubic foot.

I claim:

1. A method for forming a lightweight granular structure comprising forming a slurried mixture of high viscosity including as the essential slurry constituents, water, relatively low density foam particles having a large surface area compared to volume caused by tears and serrations which provide ragged ridges and intersect a substantial number of foam cells opening the foam cells to the exterior and a material chosen from the group consisting of cement and gypsum, bringing about the penetration of the foam particles by said material and said water and distributing the particles substantially uniformly throughout the slurried mixture, thereafter forming said structure by positioning the slurry so that it has a vertical extent substantially greater than the largest dimension of the foam particles, and solidifying the mixture while maintaining the slurry still with said particles distributed substantially uniformly throughout said mixture.

2. The method of claim 1 wherein the foam particles serrations are saw-toothed like.

3. The method of claim 2 wherein the foam particles are formed of an acrylonitrile styrene copolymer, have a maximum dimension of no more than 3/16 of an inch and a density of no more than 0.5 pound per cubic foot and the combined density of said water and said material chosen from the group consisting of cement and gypsum is greater than water.

4. A method for forming a lightweight granular structure comprising forming a slurried mixture, the mixture having a relatively high viscosity and including as essential slurry constituents, water, relatively low density foam particles having a large surface area compared to volume caused by tears and serrations which provide ragged ridges and intersect a substantial number of foam cells opening the foam cells to the exterior, and a material chosen from the group consisting of cement and gypsum, bringing about the penetration of the foam particles by said material and said water and distributing the particles substantially uniformly throughout the slurried mixture, and thereafter solidifying the mixture with said particles distributed substantially uniformly throughout said mixture.

5. In a method of making gypsum wallboard, the improvement comprising the steps of forming lightweight expanded cellular plastic beads having a major diameter of about ¼ to ¾ inch and a density of about 0.2 to 0.5 lb./cu.ft., shredding said beads into lightweight fragments of a size of no more than about 3/16 inch having highly uneven, rough exterior surfaces, mixing said shredded fragments with an aqueous settable gypsum slurry, and allowing said slurry to set and dry with said fragments embedded therein.

6. In a method for forming a lightweight granular structure including the steps of preparing a building material slurry devoid of slurry thickeners by mixing slurry constituents, the constituents comprising water and a substantial amount of gypsum or cement the improvements which comprises the steps of adding to said slurry in an amount sufficient to substantially reduce the density of said slurry relatively low density foam particles having a large surface area compared to volume caused by tears and serrations which provide ragged ridges and intercept a substantial number of foam cells open to the exterior, mixing the foam particles and the slurry to distribute the foam particles substantially uniformly throughout the slurry and to penetrate the foam particles with the slurry and its constituents; and thereafter solidifying the slurry whereby the particles remain substantially uniformly distributed throughout the resulting granular structure.

* * * * *